United States Patent [19]
Delhom et al.

[11] Patent Number: 5,477,775
[45] Date of Patent: Dec. 26, 1995

[54] MACHINE FOR PREPARING HOT BEVERAGES PROVIDED WITH A DEVICE FOR VARYING THE FLAVOR OF THE BEVERAGES

[75] Inventors: Daniel Delhom, Cauterets; Patrick Charles, Louey, both of France

[73] Assignee: SEB S.A., Selongey Cedex, France

[21] Appl. No.: 215,773

[22] Filed: Mar. 22, 1994

[30] Foreign Application Priority Data

Mar. 24, 1993 [FR] France ................................. 93 03634

[51] Int. Cl.6 ....................................... A47J 31/10
[52] U.S. Cl. ............................... 99/299; 99/305
[58] Field of Search ..................... 99/299, 279, 300, 99/302 R, 304, 305, 306, 307, 316, 318, 295; 426/433

[56] References Cited

U.S. PATENT DOCUMENTS

| | | | |
|---|---|---|---|
| 3,484,245 | 12/1969 | Goto | 99/299 |
| 3,935,805 | 2/1976 | Ihlenfeld . | |
| 4,056,050 | 11/1977 | Brown | 99/305 |
| 4,108,053 | 8/1978 | Vink . | |
| 4,191,100 | 3/1980 | Marotta . | |
| 4,328,740 | 5/1982 | McDonough et al. . | |
| 4,920,869 | 5/1990 | Landais . | |

FOREIGN PATENT DOCUMENTS

| | | |
|---|---|---|
| 2625893 | of 0000 | France . |
| 2750884 | of 0000 | Germany . |
| 2751310 | of 0000 | Germany . |

*Primary Examiner*—Robert W. Jenkins
*Attorney, Agent, or Firm*—Loeb and Loeb

[57] ABSTRACT

A machine for making hot beverages composed of a chamber having at least one water outlet, a filter holder located beneath the chamber holding a mass of ground product, a water distribution member disposed below the water outlet for directing water onto the surface of the ground product contained in the filter holder, the water distribution member being provided with a plurality of perforations for conducting water into the filter holder, and a device for regulating the distribution of water into the filter holder. The water distribution member is composed of a plate having a center and a periphery, and a plurality of walls extending upwardly from the plate to divide the member into a plurality of individual sections, and the plate is provided with a plurality of water passage perforations each located in one of the sections. The member and the chamber are mounted in the machine in a relatively movable manner for establishing a desired relative position of the water outlet above the individual sections.

16 Claims, 2 Drawing Sheets

MACHINE FOR PREPARING HOT BEVERAGES PROVIDED WITH A DEVICE FOR VARYING THE FLAVOR OF THE BEVERAGES

BACKGROUND OF THE INVENTION

The present invention relates to the general technical field of hot beverage making machines in which a hot beverage is produced by a process that can be termed lixiviation, i.e. passage of hot water, as a solvent, through a ground product having a defined granulometry.

The invention more specifically concerns a hot beverage machine, and in particular a coffee maker, having at least one hot water outlet disposed above a filter holder, a hot water distribution plate for distributing water across the surface of the ground product contained in the filter holder, the plate being provided with perforations and being located under the water outlet, as well as means for regulating the distribution of water.

It has already been attempted to master the spraying of coffee grounds in order to obtain an optimum extraction of the essence and flavors contained in the grounds. To this end, French application FR-A-2625893 discloses equipping a spraying head with a valve which is controlled by a delay device. The valve can occupy a first position corresponding to the start of the operating cycle of the coffee maker and inducing, by the intermediary of perforations, a peripheral spraying of the coffee grounds. In a second stage of the operating cycle of the coffee machine, the valve occupies a second position controlled by the delay device, the second position being one in which the coffee grounds are sprayed in their central zone. Such a device arrives, in the end, at a spraying of the coffee grounds which is variable in time, shifting in a discontinuous manner from a peripheral spraying to a central spraying of the coffee grounds.

Such a device can be considered as making a positive contribution to the general goal of mastering the phenomenon of lixiviation and more generally of mastering the extraction of the essence of ground coffee, but it is in order to consider that this prior art device also has shortcomings. Thus, its fabrication requires the assembly of supplemental pieces such as a valve and a delay device. Moreover, this device does not allow account to be taken of variations in granulometry or type of grounds, which, overall, does not permit the user to himself regulate the flavor of the beverage which he desires to obtain.

It has also been disclosed, in German application A-2751310, to improve the extraction of essence from ground coffee by permitting the user to himself regulate the zone of impact of the water on the coffee grounds. This prior art device includes a distribution plate provided with peripheral orifices and a central orifice having a larger diameter. Water flows onto the grounds across the distribution plate, starting from a hot water outlet disposed above the plate and along the axis of the central orifice. Mastery of the distribution of water is assured by a regulating means constructed in the form of a deflection plate provided with a position regulating lever. The deflection plate can thus occupy a position beneath the hot water outlet opening, or a second position spaced from the axis of hot water flow. The user can thus regulate the distribution of hot water on the surface of the grounds by adjusting the position of the deflection plate which in its position beneath the outlet opening leads hot water to spray the periphery of the grounds, and in the other position leads the hot water into contact with the central zone of the grounds.

It must therefore be considered that this device permits the user to himself regulate to a certain extent the quality of the extraction of essence from the grounds, in order to take into account for example the quantity or the type of grounds utilized. It must however be recognized that this device only permits a limited regulation of the flavor of the beverage obtained because there are, in the final analysis, only two different extraction positions.

SUMMARY OF THE INVENTION

It is an object of the present invention to provide a novel hot beverage machine, in particular a coffee maker, which does not have the shortcomings of known devices and permits the user to himself regulate, with the aid of particularly simple means, and with a large number of possible variations, the distribution of water on the ground product, in order to obtain a large range of variations for the hot beverage.

Another object of the invention is to provide a hot beverage machine in which regulation of the spraying as a function of the beverage desired is obtained with the aid of particularly simple means and in an accurately reproducible manner.

Another object of the invention is to provide a hot beverage machine in which the user has available a large range of possibilities for regulating the type of beverage.

The above and other objects are achieved, according to the invention in a machine for making hot beverages comprising means defining at least one water outlet, a filter holder located beneath the means defining at least one water outlet for holding a mass of ground product, a water distribution member for directing water onto the surface of the ground product contained in the filter holder, the water distribution member being provided with a plurality of perforations for conducting water into the filter holder, and means for regulating the distribution of water into the filter holder, by the improvement wherein: the water distribution member comprises a plate having a center and a periphery, and a plurality of walls extending upwardly from the plate to divide the member into a plurality of individual sections, and said plate is provided with a plurality of water passage perforations each located in one of the sections; and the member and the means defining at least one water outlet are mounted in the machine in a relatively movable manner for establishing a desired relative position of the water outlet above the individual sections.

Other features and advantages of the invention will become more readily apparent from a reading of the following description, presented with reference to the attached drawings, given by way of illustrative and nonlimiting example.

DESCRIPTION OF THE PREFERRED EMBODIMENTS

In the following description, reference will be made to a hot beverage machine in the form of a coffee maker, it being understood that the objects of the invention are applicable to any similar hot beverage machines for making a hot beverage such as, for example, coffee, tea, etc.

Figure 1:
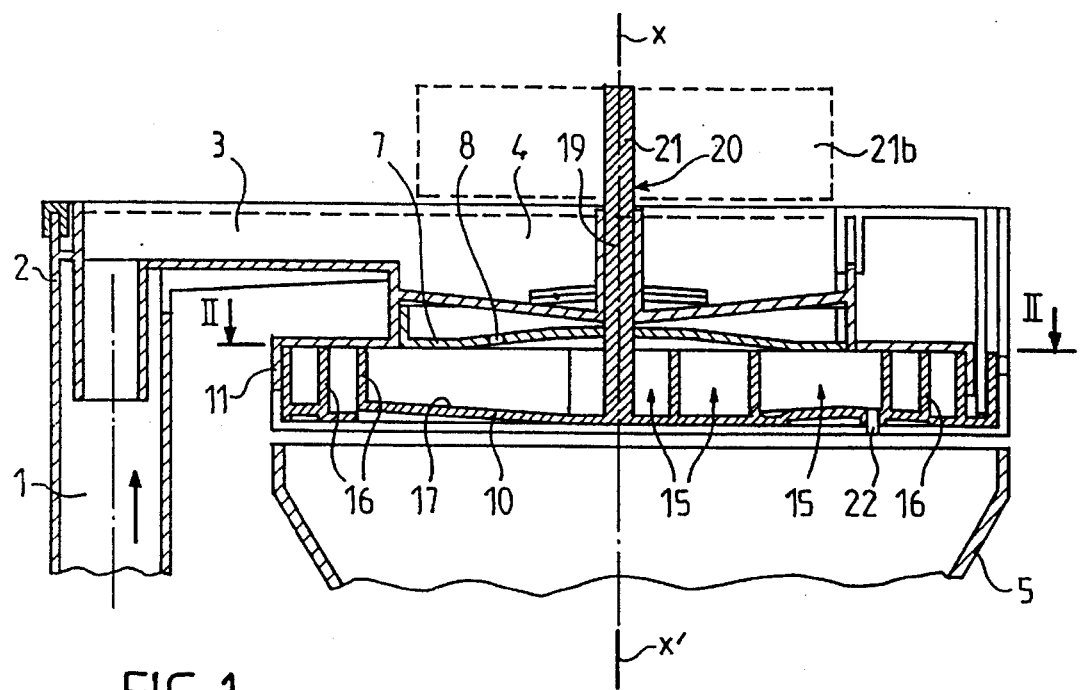
FIG. 1 is an elevational, cross-sectional detail view of a portion of a coffee maker according to a preferred embodiment of the invention, provided with a water distribution plate according to the invention.

FIG. 1 shows in detail the upper portion of a coffee maker (the remaining components being conventional and not being shown). The illustrated machine is a filter type coffee maker. The coffee maker includes a tube 1 connected in a conventional manner to a reservoir and a heating means such as a sheathed heating resistor. Hot water is conveyed from the reservoir upwardly through tube 1. The tube 1 is connected at its upper end 2 to an outlet conduit 3 forming a 90° bend, or elbow, and opening into a water distribution chamber 4. The latter defines a volume of revolution, or chamber, which is, for example, cylindrical and has a vertical axis of symmetry, x-x'.

The coffee maker according to the invention also includes, in a conventional manner, a filter holder 5 in the form of a cone or a conic frustum disposed beneath water distribution chamber 4, at a distance therefrom. The filter holder 5 has a vertical axis of symmetry which is coaxial with axis x-x'. The filter holder 5 is intended to contain, in a conventional manner, a defined quantity of ground coffee. The water distribution chamber 4 defines, in its lower portion, a buffer, or distribution, zone intended to regulate, or spread out, the flow of hot water coming from outlet conduit 3.

The water distribution chamber 4 is delimited at its lower portion by a bottom, or base, 7 in the thickness of which is arranged at least one hot water outlet 8, which has a form that is, for example, circular or oblong. According to a preferred embodiment of the invention, bottom 7 is provided with a series of three hot water outlets 8 angularly offset from one another by 120° around axis x-x'. The bottom 7 extends above, and at a distance from, a water distribution plate 10 having, for example, the form of a disc and rigidly secured to water distribution chamber 4 through the intermediary of an external housing 11 which is attached by any suitable means onto the body of water distribution chamber 4.

Figure 2:
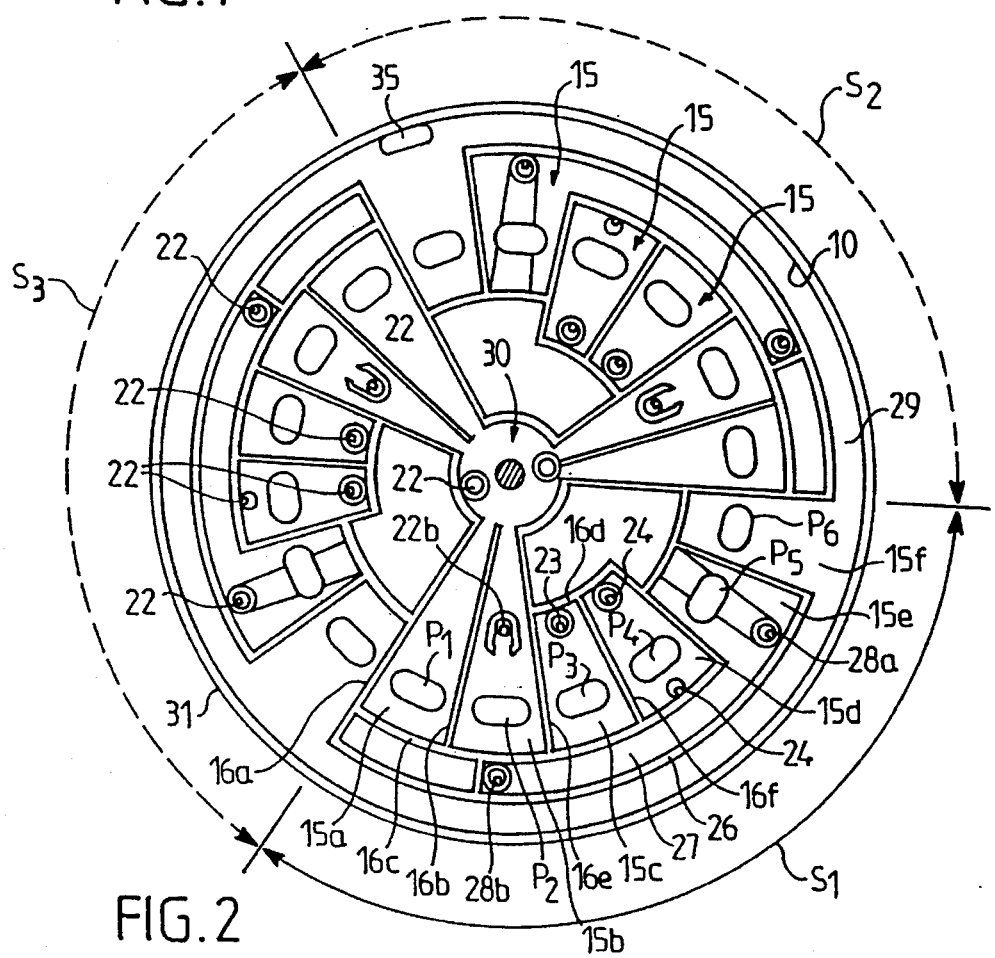
FIG. 2 is a top plan view taken in the plane II—II of FIG. 1, of the water distribution plate of FIG. 1.

The water distribution plate 10 and the outlet or outlets 8 are mounted with a possibility of relative movement therebetween, and in the embodiment shown in FIGS. 1 and 2, water distribution plate 10 is mounted to be movable in rotation around its axis of symmetry which is coaxial with axis of symmetry x-x'. The water distribution plate 10 extends equally above filter holder 5 and is consequently interposed directly between the ground coffee contained in filter holder 5 and the water outlet or outlets 8. The water distribution plate 10 includes a series of individual sections 15, designated hereinafter as sectors, delimited by a series of vertical walls 16 extending from the upper surface 17 of water distribution plate 10.

As shown particularly in FIG. 1, water distribution plate 10 is provided with a regulating, or control, means 20 for regulating the position of water distribution plate 10 with respect to outlet 8. Control means 20 include a regulating shaft 21 extending along axis x-x' through water distribution chamber 4 and emerging above and at the exterior of water distribution chamber 4. Advantageously, shaft 21 has a regulating button, or knob, 21b fixed at its upper part. As a result, water distribution plate 10 can be controlled by the user and rotated about axis x-x' in a manner to adjust the position of each individual sector 15 and to select one of sectors 15 to bring it in line with one of the water outlets 8.

As shown in FIG. 2, each individual sector 15 includes at least one opening, or perforation, 22, 22b, 23, 24, 28a, 28b, occupying, with respect to the axis of symmetry x-x' of the mass of ground coffee, a radial position characteristic of the sector, the characteristic radial position of the perforation or perforations in each sector being different from the characteristic radial position of the perforation or perforations in each other sector 15 of a particular group of sectors. In the particular embodiment shown in FIG. 2, water distribution plate 10, in the form of a disc, has three identical sector groups 51, 52 and 53 which are substantially radial, and are angularly offset by 120° from one another. Each sector group S1, S2 or S3, and for example sector group S1, includes a first radial sector 15a delimited by two radial walls 16a and 16b and configured so that water will flow toward the central zone 30 of water distribution plate 10. Radial walls 16a and 16b are connected together at a distance from the periphery 31 of water distribution plate 10 by means of a peripheral wall 16c. In the embodiment shown in FIG. 2, the first radial sector 15a is associated with at least one, and preferably two, perforations 22 arranged in the central zone 30 in the vicinity of the center of water distribution plate 10. Perforations 22 in central zone 30 can be circular or oblong, for example.

Sector group S1 includes a second radial sector 15b adjacent the first radial sector 15a and separated therefrom by common radial wall 16b. Sector 15b is identical in form to sector 15a and communicates via an opening with the central zone 30. The second radial sector 15b is provided substantially in its central part with a central perforation 22b. The second radial sector 15b is limited toward the outside at its periphery by an extension of peripheral wall 16c.

Sector group S1 includes a third radial sector 15c which is completely closed around its periphery and is located adjacent to the second radial sector 15b. The third radial sector 15c is bounded toward the exterior by a peripheral wall constituting an extension of peripheral wall 16c and toward the interior by an internal wall 16d extending along a line concentric with the center of water distribution plate 10, at substantially the same spacing from the center as perforation 22b. The third radial sector 15c is bounded laterally by a radial wall 16e common with the second radial sector 15b and by another radial lateral wall 16f. The third radial sector 15c includes a perforation 23 situated at the same distance from the center of water distribution plate 10 as central perforation 22b, i.e. perforations 22b and 23 are located on the same circle coaxial with the center of water distribution plate 10.

Sector group S1 includes a fourth radial sector 15d adjacent radial sector 15c and having a form and dimensions identical to those of radial sector 15c. The fourth radial sector 15d has two perforations 24 one of which is situated on the same circle as perforation 23 and the other of which is situated in the vicinity of peripheral wall 16c bounding the outer part of the fourth radial sector 15d.

Sector group S1 includes a fifth radial sector 15e adjacent to the fourth radial sector 15d and extending radially toward the outside beyond peripheral wall 16c. The fifth radial sector 15e is bounded toward the outside by a second peripheral wall 26. Peripheral wall 26 is also coaxial with the center of water distribution plate 10 and defines with peripheral wall 16c an annular sector 27 extending circumferentially past the third and fourth radial sectors 15c and 15d, bounded toward the inside by wall 16c, and terminating in the vicinity of the second radial sector 15b. The fifth radial sector 15e is preferably provided with two perforations 28a and 28b both situated on the same circle that is coaxial with the center of water distribution plate 10. Preferably, perforation 28b is disposed at the extremity of annular sector 27 at the level of the second radial sector 15b, while perforation 28a is situated at the other peripheral extremity of annular sector 27.

Sector group S1 includes, finally, a sixth radial sector 15f adjacent to the fifth radial sector 15e. In addition, water distribution plate 10 includes an annular peripheral sector 29 defining the periphery of water distribution plate 10. Peripheral annular sector 29 communicates with the radial sector 15f of each of sector groups S1, S2 and S3 and is provided with at least one perforation 35 associated with, and connected to, a conduit (not shown) opening outside of the filter holder in order to furnish hot water which has not passed through the ground coffee. Peripheral sector 29 thus extends around the entire periphery of water distribution plate 10 and communicates with the radial sector 15f of each of sector groups S1, S2 and S3.

In an advantageous manner, perforations 22, 22b, 23, 24, 28a and 28b have diameters, or areas, which are dependent on the proximity of the particular perforation to the center of water distribution plate 10. In other words, the closer a perforation is to the center of water distribution plate 10, the larger is the passage which it provides. Thus, perforations 22 at central zone 30 are the largest and are constituted, for example, by circular orifices having a diameter of the order of 4 mm. Perforations 22b, 23 and 24, disposed at an intermediate location, are, for example circular and have a diameter of the order of 3 mm. Perforations 28a and 28b are for example circular and have a diameter of the order of 1.5 mm. The rate of delivery of hot water which flows through the grounds is thus regulated in a simple manner and decreases radially from the center toward the exterior of the mass of grounds, which is proportional to the thickness of the grounds when held in a cone filter. It is however possible, by way of modification, to reverse the position of the large diameter perforations by disposing them at the periphery of water distribution plate 10, while placing the smallest diameter perforations in the vicinity of the center of water distribution plate 10.

The functioning of the above-described device is as follows.

The user acts on control means 20 in order to select, firstly, the relative position of the water outlet or outlets 8 with respect to at least one specific individual sector 15 in dependence on the flavor and strength of the coffee which it is desired to obtain. According to a first regulating possibility shown in FIG. 2, the user can bring each first radial sector 15a in line with and under an outlet 8. In this first position, an outlet 8 occupies the position P1 above and in line with the first radial sector 15a (FIG. 2). In the preferred embodiment shown in FIG. 2, each one of three outlets 8 is disposed above and in line with a respective one of the three first radial sectors 15a offset from one another by 120°. In this position, hot water arrives in water distribution chamber 4 and then flows through each of hot water outlets 8 into each of the first radial sectors 15a. Spraying of the coffee grounds is thus effectuated uniquely via the central perforations 22 having a relatively large diameter, which leads to a preferential flow at a high rate through the totality of the mass of ground coffee and in particular through the region of this mass which has the greatest depth, or thickness. In the noted position P1, the user thus obtains coffee having a strong flavor, by the combination of the passage of hot water through the perforations which have the largest cross-sectional area and by spraying of the center of the mass of coffee grounds.

The user can also position water distribution plate 10 so that the hot water outlets 8 are disposed in line with and above each of the second radial sectors 15b. In this position, identified as P2, spraying is effectuated through perforations 22b having an intermediate diameter and a median position, and simultaneously through central perforations 22. In the position P2, the user thus obtains coffee having an intermediate flavor, or strength, since one part of the hot water has passed through coffee grounds having an overall depth, or thickness, smaller than at the location below central perforations 22.

When the user positions the third radial sectors 15c in line with and beneath water outlets 8, he obtains coffee having a slightly less pronounced flavor since in this latter position, identified as P3, spraying is no longer effectuated via central perforations 22, but only via median perforations 23.

In position P4, the user obtains coffee having an even weaker flavor since all of the water flows into the coffee grounds at a location to traverse a thickness of coffee grounds which is less than in the previous positions.

Finally, position P5 corresponds to coffee having a weak flavor because the water spraying is effected only via orifices 28a and 28b having a smaller diameter and a radial position which is the furthest from the center of the mass of coffee grounds, where the mass of coffee grounds has the smallest depth, or thickness.

Position P6 corresponds to a flow of the water through perforation 35 connected to an evacuation channel (not shown in the drawings) opening outside of the region enclosed by filter holder 5. In this position, the user obtains only hot water.

It will thus be seen that the differentiated spraying of a mass of coffee grounds is at the heart of the attainment of coffee having different flavors, or strengths, even if during the course of making of the coffee, the mass of ground coffee is, in the end, always wetted with hot water. It should also be noted that the utilization of radial sectors 15 permits a maximum reduction of the flow of water along a lengthy, e.g. serpentine, path, thus avoiding a loss of heat.

Figure 3:
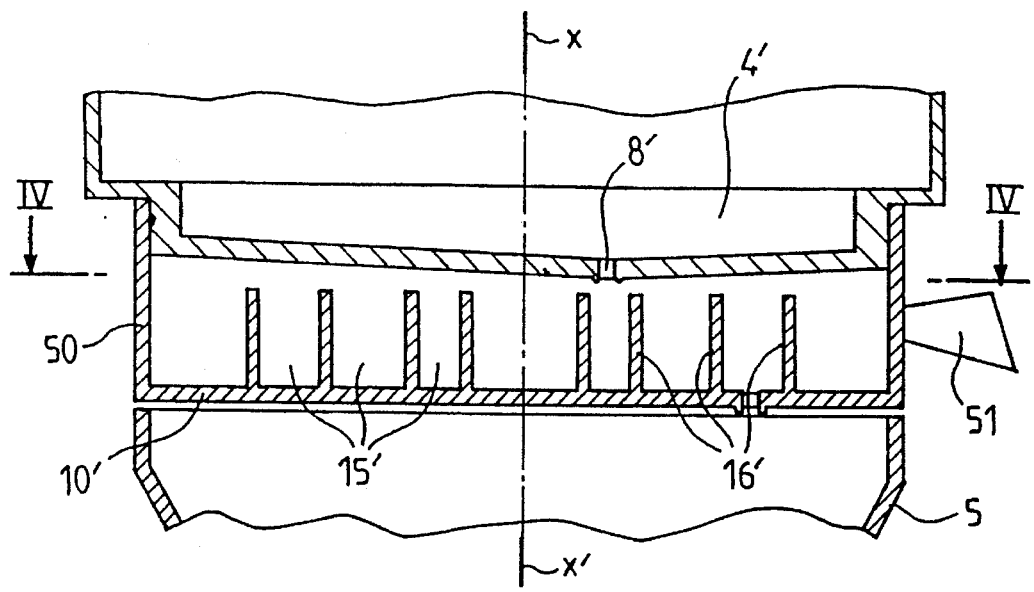
FIG. 3 is a view similar to that of FIG. 1 showing a second embodiment of a water distribution plate according to the invention.
Figure 4:
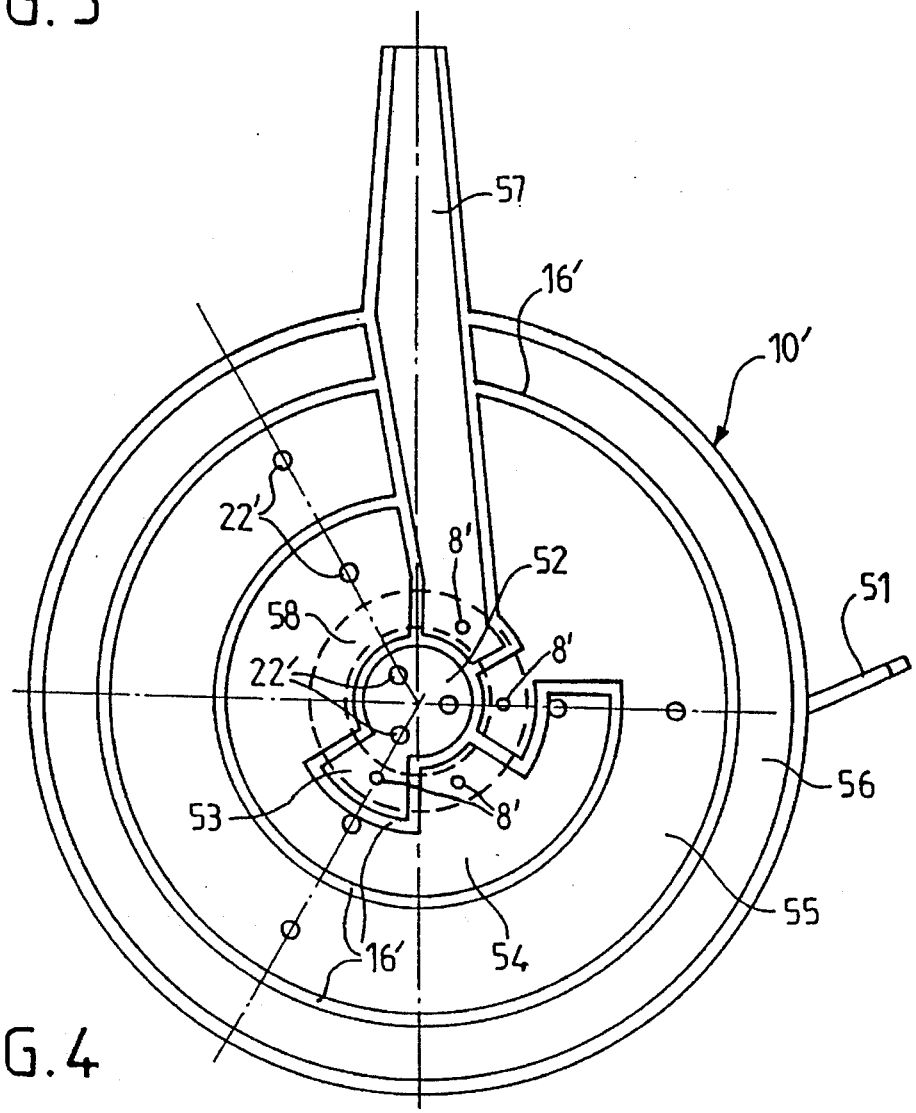
FIG. 4 is a top plan view in the plane IV—IV of FIG. 3, of the water distribution plate of FIG. 3.

FIGS. 3 and 4 show a second illustrative embodiment of the invention which differs essentially from the first embodiment of FIGS. 1 and 2 only by a different arrangement of individual sectors 15. According to this second embodiment, a water distribution plate 10' is united at its periphery with a circular wall 50 extending upwardly from plate 10'. Plate 10' is mounted with the possibility of rotation around the axis x-x' beneath a water distribution chamber 4'. Rotation of water distribution plate 10' can be effected by acting on a lever or handle 51 fixed to wall 50. Individual sectors 15' are delimited by a series of walls 16' which follow a circular path and are preferably concentric with axis x-x'. Walls 16' extend upwardly from the upper surface of water distribution plate 10'. Water distribution plate 10' includes a central sector 52 bounded by a wall 16' which is substantially circular except for a radial zone 53 forming a radial protrusion with respect to the central sector 52. Central sector 52 has, essentially at its center, a series of three perforations 22'.

Water distribution plate 10' includes, in addition, an intermediate sector 54 bounded by a wall 16' at least partially surrounding, in a concentric manner, radial sector 52. Intermediate sector 54 also includes a series of three perforations 22' situated on a circle having a diameter greater than a circle containing the centers of the perforations 22' of central sector 52.

Water distribution plate 10' also includes an exterior sector 55 bounded by a circular wall 16' which is concentric with the other walls 16' exterior sector 55 also having three perforations 22' situated on a circle having a diameter greater than the circle associated with the perforations 22' of intermediate sector 54.

Water distribution plate 10' includes at its periphery a further circular wall 16' defining with the wall bounding external sector 55 a peripheral channel 56. In addition, plate 10' includes a radial channel 57 which begins at the wall 16' of central sector 52 and has an outlet at a location outside of the periphery of plate 10'.

Each of the defined sectors provides at least one zone extending to a common annular region 58 shown in broken lines in FIG. 4 and corresponding to the zones of possible projection of the exterior limits of associated water outlet 8'. In particular, radial zone 53 forming a protrusion is situated in the field covered by annular region 58. FIG. 4 shows four exemplary locations of outlet 8' above region 58.

This second embodiment functions in a manner analogous to the first-described embodiment and requires, on the part of the user, a pre-positioning, by acting on lever 51, of individual sectors 52, 54 or 55 relative to water outlet 8', it being assumed in this embodiment that there is a single outlet 8'. When outlet 8' is in line with radial zone 53, spraying of the ground coffee is effectuated via perforations 22' of central sector 52, which corresponds to the attainment of coffee having a strong taste. When, by rotation of water distribution plate 10', water outlet 8' is disposed in line beneath a region of intermediate sector 54, spraying of water via perforations 22' of this sector yields coffee having a medium strength, or taste. Finally, when water outlet 8' is above and in line with a region of exterior sector 55, spraying of the ground coffee takes place in a peripheral zone of water distribution plate 10' which produces a lightly flavored coffee. When water outlet 8' is situated above channel 57, the user obtains only hot water. Of course, it is possible to position water outlet 8' so that it straddles two adjacent individual sectors, in order to obtain coffee having a strength, or flavor, which is intermediate between those produced when all of the water is delivered to one of those sectors.

By way of modification, it is also possible to interchange the structure of the regulating means and to provide a water distribution chamber 4 or 4' which is movable relative to water distribution plate 10 or 10', regulation consisting then in adjusting the position of water outlet 8' above one or two of the individual sectors 15, or 52, 54, 55 and 56.

It should be noted that one thus obtains, by simple means, a regulation offering a multitude of settings for a desired quality or strength of coffee, or other beverage produced by a similar mechanism.

This application relates to subject matter disclosed in French Application number 9303634, filed on Mar. 24, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a machine for making hot beverages comprising means defining at least one water outlet, a filter holder located beneath the means defining at least one water outlet for holding a mass of ground product, a water distribution member disposed below the water outlet for directing water onto the surface of the ground product contained in the filter holder, the water distribution member being provided with a plurality of water passage perforations for conducting water into the filter holder, and means for regulating the distribution of water into the filter holder, the improvement wherein:

said water distribution member comprises a plate having a center and a periphery, and a plurality of walls extending upwardly from said plate to divide said member into a plurality of individual sections, and said plate is provided with said plurality of water passage perforations each located in one of said sections for conducting water into contact with the ground product; and said member and said means defining at least one water outlet are mounted in said machine in a relatively movable manner for establishing a desired relative position of said water outlet above said individual sections.

2. A machine according to claim 1 wherein each individual section extends across a region of said plate which contains at least one of said perforations and the at least one of said perforations in the region of each said individual section occupies, with respect to an axis of symmetry of said filter holder, a radial position characteristic of the associated individual section, the radial position of the at least one of said perforations in each one of said individual sections being different from that in each other one of said individual sections.

3. A machine as defined in claim 2 wherein each of said individual sections has a surface area capable of being placed beneath at least said one water outlet.

4. A machine as defined in claim 3 wherein said plate is constituted by a disk mounted in said machine for rotation around an axis of symmetry passing through said center of said plate in order to be able to bring, by rotation, a selected of one of said individual sections below at least one said water outlet.

5. A machine as defined in claim 3 wherein said plate is constituted by a disk which is fixed in said machine and said means defining at least one water outlet are mounted to be movable in order to bring at least one said water outlet in line with a selected one of said individual sections.

6. A machine as defined in claim 5 wherein respective ones of said perforations are at respectively different distances from said center of said plate and each said perforation has a water flow cross section with an area inversely proportional to the distance of that said perforation from said center of said plate.

7. A machine as defined in claim 6 wherein said individual sections extend radially from said center of said plate and are disposed adjacent one another in a circumferential direction about said center of said plate.

8. A machine as defined in claim 7 wherein one of said sections is associated with a conduit having an outlet opening positioned externally of said filter holder for furnishing hot water which does not pass through a ground product in said filter holder.

9. A machine as defined in claim 1 wherein respective ones of said perforations are at respectively different distances from said center of said plate and each said perforation has a water flow cross section with an area inversely proportional to the distance of that said perforation from said center of said plate.

10. A machine as defined in claim 1 wherein said individual sections extend radially from said center of said plate and are disposed adjacent one another in a circumferential direction about said center of said plate.

11. A machine as defined in claim 10 wherein said plate has a central section surrounding said center of said plate and said plurality of individual sections are arranged in three identical groups, with said groups being angularly offset from one another about said center of said plate by 120°, with each said group comprising:

- a first radially extending individual section bounded by radially extending first and second ones of said walls and communicating via an opening with said central section, said first and second walls being connected together by a third one of said walls which is located at a distance from said periphery of said plate, said first individual section being associated with at least one perforation located in said central section;
- a second radially extending individual section radially adjacent said first individual section and identical in form to said first individual section, said second individual section communicating via an opening with said central section and being provided with a respective one of said perforations disposed at an intermediate point along the radial extent of said second individual section;
- a third radially extending individual section adjacent said second individual section and bounded at an edge remote from said center of said plate by said third wall, said third individual section containing at least one perforation situated at the same distance from said center of said plate as said perforation contained in said second individual section;
- a fourth radially extending individual section adjacent said third individual section and having a form and dimensions identical to those of said third individual section, said fourth individual section containing two of said perforations, with one of said two perforations being located at the same distance from said center of said plate as said perforation contained in said third individual section, and the other one of said two perforations being located in the vicinity of the region of said fourth individual section which is most remote from said center of said plate, said region of said fourth individual section which is most remote from the center of said plate being bounded by said third wall;
- a fifth radially extending individual section disposed adjacent said fourth individual section and extending radially away from said center of said plate to a location beyond said third wall, said fifth individual section being bounded by a fourth one of said walls which is further from said center of said plate than is said third wall, said third and fourth walls defining an annular region of said fifth individual section, which annular region extends radially to the location of said second individual section, said fifth individual section being provided with two of said perforations; and
- a sixth radially extending individual section located adjacent said fifth individual section and provided with an annular portion containing a respective one of said perforations.

12. A machine as defined in claim 11 wherein one of said sections is associated with a conduit having an outlet opening positioned externally of said filter holder for furnishing hot water which does not pass through a ground product in said filter holder.

13. A machine as defined in claim 1 wherein one of said sections is associated with a conduit having an outlet opening positioned externally of said filter holder for furnishing hot water which does not pass through a ground product in said filter holder.

14. A machine as defined in claim 1 wherein said individual sections comprise:

- a substantially circular central section surrounding said center of said plate perforations; and intermediate section surrounding at least a portion of said central section and provided with three of said perforations; and outer section surrounding at least a portion of said intermediate section and provided with three of said perforations; a radial section defining a radial channel which extends from said central section to a location beyond said periphery of said plate, wherein said central, intermediate, outer and radial sections are configured so that each said section extends across an annular zone of said plate, which annular zone surrounds said center of said plate and is located directly below said water outlet opening.

15. A coffee maker comprising a machine as defined in claim 1.

16. A machine as defined in claim 1 wherein each said perforation has a water flow cross-section with an area and the water flow cross-sections of at least two of said perforations have respectively different areas.

\* \* \* \* \*